United States Patent [19]

Rohleder et al.

[11] Patent Number: 5,503,705
[45] Date of Patent: Apr. 2, 1996

[54] DEVICE FOR PRODUCING MULTIPLE INDIVIDUAL COMPOSITES HAVING TWO OR MORE LAYERS

[75] Inventors: Sabine Rohleder, Weiterstadt; Jochen Coutandin, Langenlonsheim; Burkhard Hoppe, Taunusstein, all of Germany

[73] Assignee: Hoechst Aktiengesellschaft, Frankfurt am Main, Germany

[21] Appl. No.: 326,357

[22] Filed: Oct. 20, 1994

Related U.S. Application Data

[63] Continuation of Ser. No. 971,550, Nov. 5, 1992, abandoned.

[30] Foreign Application Priority Data

Nov. 7, 1991 [DE] Germany ............ 41 36 706.5

[51] Int. Cl.⁶ .................................................. B32B 35/00
[52] U.S. Cl. .................... 156/494; 156/209; 156/498; 156/379.8; 156/380.9; 156/555; 156/580; 156/583.1; 156/583.91; 156/584
[58] Field of Search .................... 156/209, 222, 156/288, 494, 498, 555, 580, 583.1, 583.91, 584, 499

[56] References Cited

U.S. PATENT DOCUMENTS

| | | | |
|---|---|---|---|
| Re. 27,992 | 4/1974 | Lemelson | 156/384 |
| 3,148,076 | 9/1964 | Snyder | 156/322 X |
| 3,560,322 | 2/1971 | Magid | 156/220 X |
| 3,575,793 | 4/1971 | Paisley | 156/324.4 X |
| 3,959,567 | 5/1976 | Bradley | 156/555 X |
| 4,778,557 | 10/1988 | Schirmer | 156/555 X |
| 5,019,203 | 5/1991 | Singer | 156/309.9 |
| 5,051,148 | 9/1991 | Resch | 156/358 |

FOREIGN PATENT DOCUMENTS

| | | |
|---|---|---|
| 527905 | 3/1983 | Australia . |
| 0207047 | 12/1986 | European Pat. Off. . |
| 0212232 | 3/1987 | European Pat. Off. . |
| 0363794 | 4/1990 | European Pat. Off. . |
| 0485896 | 5/1992 | European Pat. Off. . |
| 0495646 | 7/1992 | European Pat. Off. . |
| 1441508 | 2/1965 | France . |
| 2167876 | 8/1973 | France . |
| 3020008 | 12/1981 | Germany . |
| 3530309 | 2/1987 | Germany . |
| 4004793 | 9/1991 | Germany . |
| 0011579 | 4/1973 | Japan ............ 156/584 |
| 0005879 | 1/1977 | Japan ............ 156/309.9 |
| 1220080 | 1/1971 | United Kingdom . |
| 2127344 | 4/1984 | United Kingdom . |

*Primary Examiner*—David A. Simmons
*Assistant Examiner*—M. Curtis Mayes
*Attorney, Agent, or Firm*—Foley & Lardner

[57] ABSTRACT

A device and process useful for producing a plurality of individual film composites is disclosed. A temperature-controllable roll serves as a sealing tool, on the circumferential surface of which a number of plastic film webs are sealed together under the application of pressure and heat. The plastic film webs come into contact with the circumferential surface of the roll at equal or varying distances from each other and are guided over pressure rolls. These pressure rolls contact the circumferential surface of the temperature controllable roll under pressure. The plastic film webs pass through the contact areas between the pressure rolls and the temperature controllable roll. The plastic film webs are provided on one or both sides with sealing layers, which are fused by the action of heat, so that sealing of the superposed laminated plastic film webs on the circumferential surface of the temperature controllable roll occurs. No sealing layers are present at least between two superposed plastic film webs, so that the film composite can be separated at the sealing layer-free surfaces of these plastic film webs into individual composites along a partial circumference of a separating roll.

18 Claims, 3 Drawing Sheets

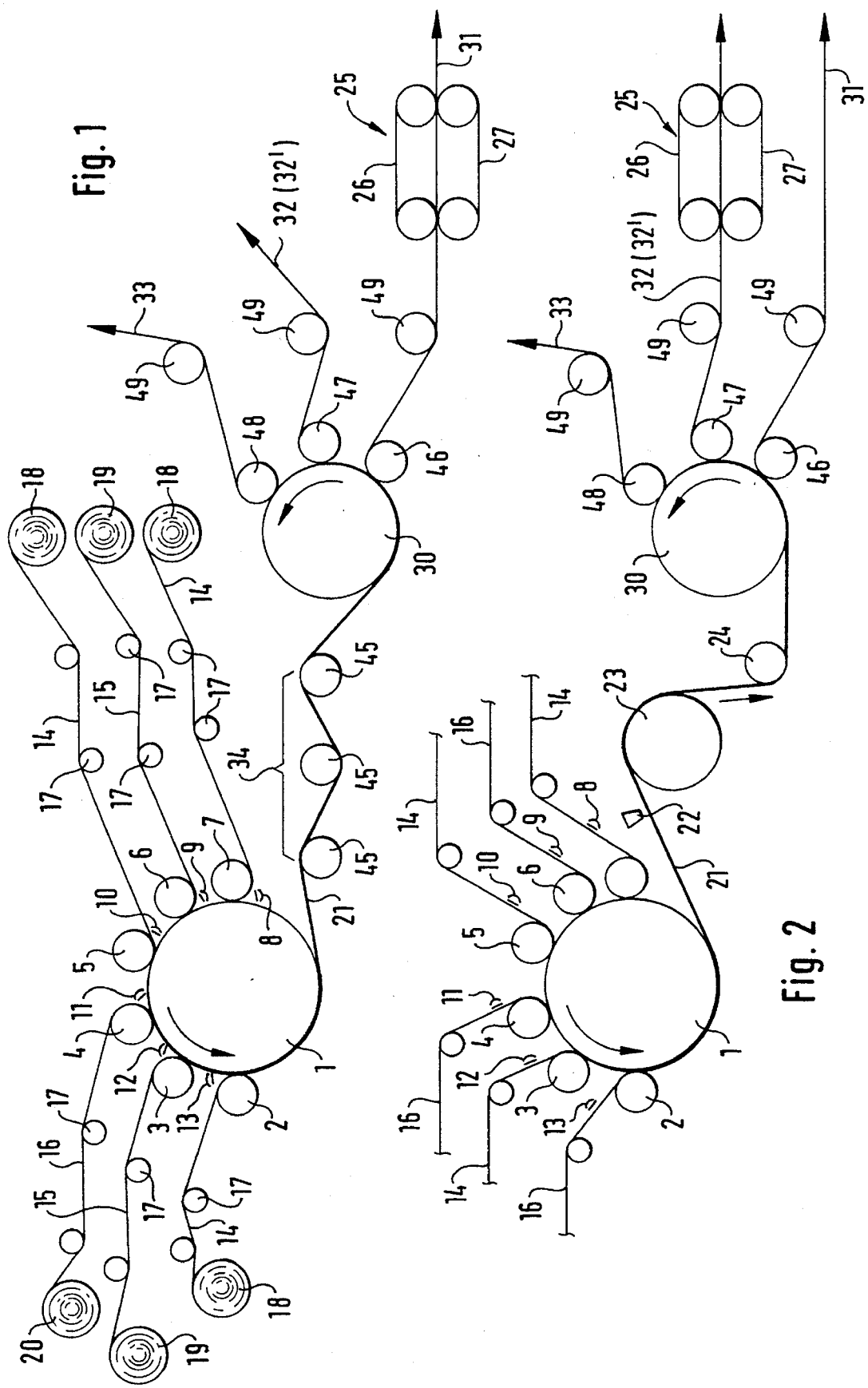

DEVICE FOR PRODUCING MULTIPLE INDIVIDUAL COMPOSITES HAVING TWO OR MORE LAYERS

This application is a continuation, of application, Ser. No. 07/971,550, filed Nov. 5, 1992, now abandoned.

BACKGROUND OF THE INVENTION

1. Field of the Invention

The invention relates to a device for producing a plurality of individual composites having two or more layers. The composites are made from a plurality of plastic film webs which are sealed together. The invention also relates to a process for producing a number of individual composites having two or more layers. The layers are made from plastic film webs including one or more biaxially stretched thermoplastic, stretched thermoplastic, and monoaxially unstretched thermoplastic, coextruded films. The films are provided with a sealing layer on at least one side, and the composite is formed by sealing with the application of pressure and heat.

2. Background

Various industries such as apparatus engineering, automotive and aeronautical engineering, or safety technology, are becoming increasingly interested in high-strength film composites and composite bodies in the form of webs, semi-finished products such as sheet and finished components. Because of this interest, techniques for producing mechanically relatively high-strength products are being developed by sheet manufacturers. Simultaneously with the modification of polymeric materials used in sheet production by the incorporation of reinforcing materials such as textile, glass or carbon fibers, techniques are being developed for manufacturing inherently strengthened sheets using orientation techniques.

These techniques include roll-press stretching or the process disclosed in EP-A 0,207,047, the essential processing technique of which consists of pressing a multiplicity of biaxially stretched films treated with thin coextruded sealing layers under the application of pressure and heat to form a homogeneous sheet of any desired thickness. The stack of films inserted between two press plates thus is typically introduced into batch-operation, hydraulic platen presses of single or multi-platen design. The pressing operation is governed by process parameters such as pressure, temperature and time. The process parameter of time, in particular, hinders economical production of composite laminates, especially when through-heating very thick sheets. Continuously operating presses such as double-belt presses represent a practical, time-saving solution in this regard, but only have limited use due to the speeds they can achieve.

German Patent 35 30 309 discloses a process and a device for the continuous production of thermoplastic webs and for further processing to sheets or films, from at least one extruded thermoplastic web, which is heated to processing temperature, and then cooled while in the heated state between two pressurized stationary plates. During this process, the surface of the thermoplastic web is sized and smoothed. The cooling of the thermoplastic web takes place under the effect of surface pressure where it is guided, during cooling, between two continuously moving, endlessly circulating press belts.

A uniform surface pressure is exerted from the plates hydraulically or mechanically onto the inner side of the moving press belts and transmitted from these to the thermoplastic web. The plates are held at a temperature lower than the final temperature of the thermoplastic web in order to maintain a temperature gradient between the thermoplastic web, press belt and plate.

Cooling of the thermoplastic web takes place by dissipation of heat from the web via the press belt to the plates by thermal conduction. Also, the surface pressure is exerted continuously throughout the duration of cooling the thermoplastic web between the press belts.

SUMMARY OF THE INVENTION

An object of the invention is to develop a device so that, in one operation, a number of individual composites having two or more layers can be produced continuously and economically at high speed from hot-sealable plastic films. Another object of the invention is to provide an apparatus which can produce a plurality of composites with improved mechanical properties compared with extruded films of the same thickness and at least the same optical characteristics.

A further object of the invention is to provide a method of manufacturing a plurality of individual composites with improved properties continuously and economically at high speed.

These and other objects readily apparent to those skilled in the art may be achieved by a device according to the invention where a heatable roll forms a sealing tool, heatable pressure rolls contact the roll along its circumferential surface at equal or varying distances from each other, and plastic film webs are guided over the pressure rolls and pass through the gaps between the pressure rolls and the heatable roll. In accordance with the apparatus of the invention, a plurality of individual composites having at least two layers of film web sealed together can be produced. The device includes a plurality of film webs each wound on supply rolls where at least one of the film webs has a sealing layer disposed thereon. A heatable roll which has a circumferential surface where at least two superposed film webs may be sealed together also is provided. In the apparatus of the invention, a plurality of heatable pressure rolls which contact the heatable roll and form a gap therebetween to permit passage of the superposed film webs are used to seal the superposed film webs along the sealing layer by application of pressure and/or heat. The apparatus also includes a cooling device which cools the film composite upon release from the heatable roll and a separating roll which separates the film composite into individual film composites after cooling.

The invention also is directed to a process for producing a number of individual composites having two or more layers of film. The films are provided with a sealing layer on at least one side and a composite is formed by sealing superposed films on a circumferential surface of a heatable roll with the application of pressure and heat. The present process is distinguished by the fact that a film composite is laminated to a predetermined final thickness by the continual, additive sealing of individually moveable plastic film webs onto a movable first plastic film web. In accordance with the process, the plastic film webs are fed separately, and at a distance from each other, to a heatable, curved surface of the heatable roll and brought together and sealed along this surface in such a manner that there is no sealing layer present at least between two superposed plastic film webs. The film composite then is cooled after sealing and separated into individual composites along the plastic film webs that are not sealed together.

BRIEF DESCRIPTION OF THE DRAWINGS

FIG. 1 illustrates a schematic elevation of a device according to the invention.

FIG. 2 illustrates a schematic elevation of a device according to the invention also having a cooling arrangement.

DETAILED DESCRIPTION OF THE PREFERRED EMBODIMENTS

Figure 3:
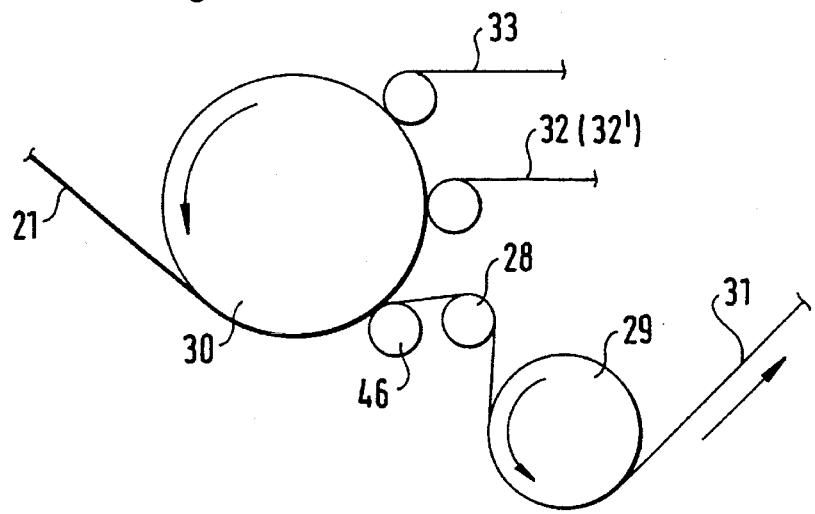
FIG. 3 illustrates a schematic view of a roll arrangement for stretching an individual composite.

The present invention will be discussed in detail with reference to specifically preferred embodiments thereof. In the drawings, like numerals represent like elements or parts of the embodiments.

The thick structure of a film composite in web form according to the invention is achieved by continual, additive lamination of individual plastic film webs, briefly fusing the hot sealing layers of the plastic film webs directly before the webs are brought together and pressing them together with linear pressure. Compared with the time-consuming conventional pressing of a compact film stack in platen presses, or the initiation of the thermal film shrinkage necessary for the homogeneous connection in the case of pipe production, the invention has the advantages that the heating and fusion process of the sealing layers, which typically are only a few μm thick, can be carried out in an extremely short period of time. Moreover, the invention also largely avoids thermal damage of the plastic material, relatively high speeds can be achieved in the continuous process and the individual composites obtained by separating the film composite can be further processed as roll goods with minimal effort.

Contrasted with the pressing of a compact film stack in which each film layer has a different temperature profile, the pressing according to the present invention typically takes place under constant, gentle conditions for each of the individual plastic film webs. In comparison to pressing a film stack to provide an individual composite using a double-belt press, lower investment costs, a higher processing speed, and a simplification of the possibilities for variation of the film composite by structuring, sizing and further processing of surfaces of the individual composites can be achieved in accordance with the present invention. Through the separation of the film composite into two- or multi-layer individual composites at the interface between plastic film webs which are not sealed together, a plurality of individual composites may be simultaneously obtained in a timely and cost-effective manner.

FIG. 1 illustrates a schematic sectional view of an embodiment of the invention comprising an apparatus for producing a number of individual composites 21 having two or more layers. A temperature-controllable roll 1, or heatable roll, which typically is a driven steel roll of large diameter, has a high-gloss polished or matt circumferential surface and forms a sealing tool for a number of plastic film webs which are sealed together. These plastic film webs, which are wound on supply rolls 18, 19, 20, are, for example, biaxially stretched plastic film webs 14, monoaxially stretched plastic film webs 15 and unstretched plastic film webs 16. Those skilled in the art recognize that any web suitable for making a composite may be wound on supply rolls 18, 19, 20. For example, any combination of biaxially or monoaxially stretched or unstretched thermoplastic, coextruded webs, and the like may be used in the present invention.

Heated pressure rolls 2, 3, 4, 5, 6 and 7 are disposed along the circumferential surface of heatable roll 1 at equal or varying distances from each other. The pressure rolls contact the circumferential surface of roll 1 under pressure. In all of the embodiments of the apparatus according to the invention illustrated in FIGS. 1 through 7, for reasons of illustration only, and not limitation, not more than six plastic films webs of this type are shown. However, up to about twenty individual plastic film webs may be sealed together, and the number of pressure rolls typically is the same as, or greater than the number of plastic film webs.

As illustrated in FIG. 1, an individual, biaxially stretched plastic film web 14 is wound on a supply roll 18, while each individual monoaxially stretched plastic film web 15 is wound on supply roll 19 and each unstretched plastic film web 16 is wound on supply roll 20. Although not shown in FIG. 1, all plastic film webs to be sealed together may be made of the same material, for example, polypropylene, with the same treatment, i.e., exclusively biaxially or monoaxially stretched and sealed to form film composite 21. Moreover, films made from various starting materials can be sealed to form a film composite, and the films typically are coextruded to form the film webs. The only requirement for film material is the sealability of the individual films to each other.

Individual plastic film webs are fed via guide rolls 17 to the associated pressure roll 2, 3, 4, 5, 6 or 7. These pressure rolls are driven, heatable rolls, the diameter of which is much smaller than the diameter of roll 1, which is self-evident with regard to their number of up to 20 individual rolls. The plastic film webs are provided with sealing layers on one or both sides, which are fused during the sealing process of the plastic film webs, as will be explained in greater detail below.

Pressure rolls 2 through 7 typically are made of a material capable of exerting a force on a plastic film web without deformation of the pressure roll, plastic film web or heatable roll 1. For example, pressure rolls 2 through 7 may be made of a hard smooth material such as metal, hardened plastic, and the like. Pressure rolls 2 through 7 may be backing rolls, the metal roll bodies of which are coated with heat-resistant rubber layers and which are heated by heating systems, not shown. Likewise, guide rolls 17, which are upstream of the individual backing rolls, can be preheated so that the plastic film webs, fed to backing rolls 17 from supply rolls 18, 19, 20, are already heated. The pressure rolls or backing rolls 2 through 7 can be displaced hydraulically, pneumatically or mechanically via a lever system so that they can be raised from the circumferential surface of roll 1 in order to facilitate the introduction of the individual plastic film webs into the gap that is delimited by the circumferential surface of roll 1 and the respective pressure rolls 2 through 7. The pressure rolls also may be pure metal rolls, and the like, without rubber coating.

The positioning of the pressure rolls, or backing rolls, in their operating positions, and the application of the pressure, with which the pressure rolls are contacting roll 1, may be by any method known which permits a sufficient force against roll 1. Such a pressure thereby exerts a corresponding sealing pressure in order to seal the respective plastic film webs onto the film composite. Typically, the positioning of the pressure rolls and the application of pressure on roll 1 is accomplished either hydraulically, pneumatically or mechanically via a lever mechanism.

A displaceable heating device 8, 9, 10, 11, 12 and 13, for specifically altering the mechanical characteristics of the starting film is disposed close to the contact areas of roll 1 and individual backing rolls 7, 6, 5, 4, 3 and 2, respectively. Displaceable heating devices 8 through 13 alter the mechanical characteristics of the starting film by shrinking and, if necessary, additionally heating the heated rolls for fusing the sealing layers of the plastics film webs. These heating devices 8 through 13 may be any device capable of exerting a specific amount of heat in a small area. Typically, displaceable heating device 8, 9, 10, 11, 12 and 13 is an infrared heater, which can be displaced along a partial zone of the length of the plastic film web. These heating devices also can be air nozzles through which hot air can be passed, which effect the fusion of the sealing layers of the plastic film webs directly before they are brought together in the respective gap. In FIG. 2, heating devices 8 through 13 are shown in positions outside the gaps between roll 1 and pressure rolls 2 through 7. The distance of the heating devices to the circumferential surface of the roll 1 also may be adjustable.

The fact that emphasis is placed on the use of coextruded biaxially or monoaxially stretched plastic film webs provided with sealing layers for the lamination or sealing to a film composite does not imply a limitation of the invention to these starting materials. Rather, those skilled in the art readily recognize that a practical alternative to the production of a film composite from coextruded plastic sealing webs results from a sealing of layers of monofilms of identical materials, which monofilms are not stretched and differ only in their degree of orientation and the morphological structure resulting from this. Compared with unstretched monofilms, mono- or biaxially stretched films have a different morphological structure, which is manifested, inter alia, in different melting temperatures of the plastic films. This can be utilized to the extent that in a film composite consisting of alternating laminated unstretched and stretched plastic film webs, the unstretched plastic film webs are capable of already fusing under normal processing conditions and thereby function as adhesion promoters with respect to the stretched plastic film webs, which do not melt under the conventional pressure and temperature conditions of the sealing process. In other words, with alternating layers of stretched and unstretched plastic film webs in this manner, none of the webs is required to have sealing layers to be laminated together. The thickness of laminated film composite 21 typically is within the range of about 100 to about 600 μm.

Upon release from roll 1, film composite 21 passes through a cooling arrangement 34 consisting of a plurality of chill rolls 45, and then is guided around a partial circumference of separating roll 30 and separated into individual composites 31, 32 (32'), 33, the structure of which will be described in greater detail with reference to FIGS. 4 and 5.

Take-off rolls 46, 47, 48 are disposed at a distance from each other along the partial circumference of separating roll 30 so that individual composites 31, 32 (32'), 33 are separated from film composite 21 and each fed via one guide roll 49 respectively for further processing. As an example, it is shown in FIG. 1 that individual composite 31 passes horizontally through a temperature-controllable double-belt press 25, which consists of two endlessly circulating press belts 26, 27 forming a common pressure gap. The two other individual composites 32 (32') and 33 also can pass through double belt presses of this type, although this is not shown. The top as well as the bottom side of individual composite 31 can be structured in a predetermined manner or also smoothed with the aid of double belt press 25.

An embodiment of a device in accordance with the invention, shown in FIG. 2, is of similar design to the embodiment illustrated in FIG. 1 with regard to roll 1, pressure rolls or backing rolls 2 through 7 and the guiding of the plastic film webs 14 and 16. For reasons of space, the supply rolls for the plastic film webs have been omitted in FIG. 2. With this device, for example, biaxially stretched plastic film webs 14 alternating with unstretched plastic film webs 16 are sealed or laminated to form film composite 21. This embodiment of the device is provided with additional equipment such as a cooling device consisting of a fan or an air nozzle 22, from which cooling air is blown onto the top side of film composite 21. In accordance with this embodiment, the device may be additionally or optionally provided with a temperature-controllable chill roll 23, over a part of whose circumference the film composite 21 is led upon release from roll 1.

A guide roll 24 is provided after chill roll 23, where film composite 21 is deflected from its vertical direction into a horizontal direction in order to subsequently be guided around the partial circumference of separating roll 30. Take-off rolls 46, 47, 48 are disposed around the circumference of separating roll 30 in the same manner as in the exemplary embodiment illustrated in FIG. 1.

In the embodiment shown in FIG. 2, individual composites 31, 32 (32'), 33 are successively separated from film composite 21 and each fed for further processing via guide roll 49 respectively. As an example, the center individual composite 32 (32') passes through a temperature-controllable double belt press 25, which comprises two endlessly circulating press belts 26 and 27, which form a common pressure gap through which individual composite 32 (32') is guided. With the aid of double belt press 25, both the top and the bottom side of individual composite 32 (32') can be structured or also smoothed in a predetermined manner. The double belt press also can be used in combination with the fan 22 and/or the chill roll 23 for additionally cooling the individual composite. Also, the cooling may be carried out by a cooling bath alone or in conjunction with the aforementioned cooling equipment.

FIG. 3 illustrates in detail additional equipment of another embodiment of a device according to the present invention, which differs from the previous embodiments. In the embodiment shown in FIG. 3, a roll arrangement comprising a temperature-controllable roll 28 and a driven, temperature-controllable roll 29 is provided as additional equipment for individual composite 31. The diameter of roll 29 typically is a multiple of the diameter of roll 28, i.e., 2, 3, 4, or 5 times as large. In accordance with this roll arrangement, the curling tendency of individual composite 31 is counteracted by stretching by exertion of a high tensile force on the individual composite. This curling tendency occurs, for example, because the top plastic film web has a greater length than the bottom plastic film web, which forms the base layer of the laminate structure of film composite 21, and subsequent laminated individual composite 31. A curling tendency can, however, be deliberately induced with this device if desired.

Individual composite 31 is drawn over roll 28 with the small diameter, causing stretching of the base layer or of the bottom plastic film web. Thus, the length difference between the bottom and top plastic film webs is compensated, and the curling tendency of individual composite 31 is eliminated.

Figure 4:
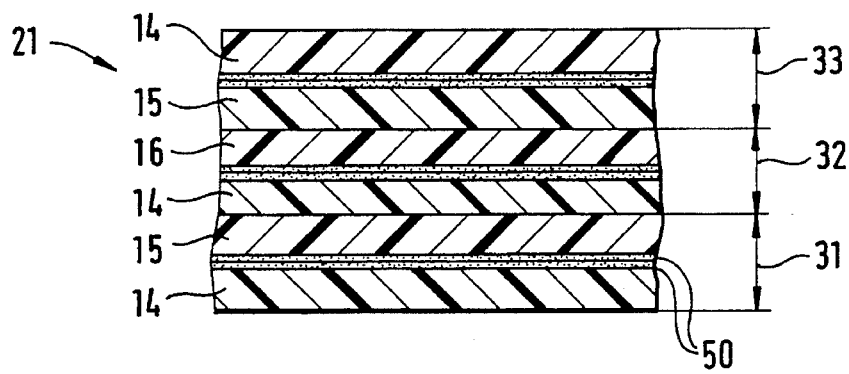
FIG. 4 illustrates a section through a 6-layer film composite which can be separated into three 2-layer individual composites.

FIG. 4 illustrates a schematic section through a film composite 21, which is built up, e.g., of six plastic film webs 14, 15, 14, 16, 15, 14, each of which has a sealing layer 50. Those skilled in the art recognize that composite 21 may be built up of fewer or more plastic film webs of the same or varying composition and mechanical film properties. The plastic film webs are superimposed on each other and welded together in such a manner that sealing layer-free surfaces of two plastics film are superposed. Problem-free separation of the film composite 21 into three individual composites 31, 32, 33 can be effected along these points, each of which individual composites consists of two layers of plastic film webs.

Figure 5:
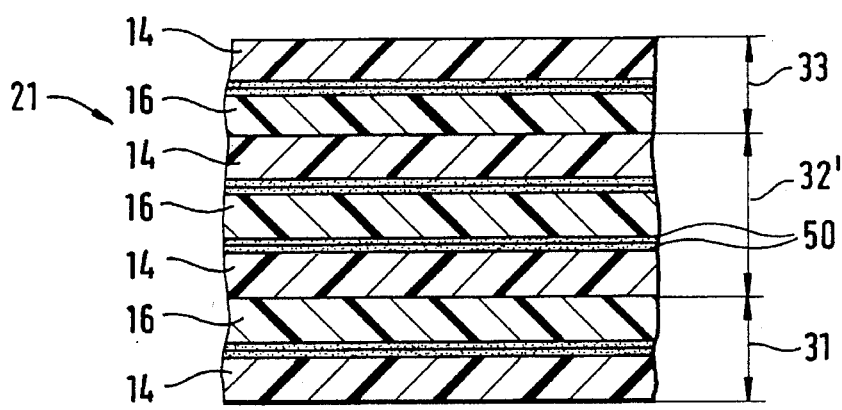
FIG. 5 illustrates a section through a 7-layer film composite which can be separated into two individual composites having 2 layers and one individual composite having 3 layers.

FIG. 5 illustrates a schematic section through a film composite 21 of seven plastic film webs 14, 16, 14, 16, 14, 16, 14, the middle plastic film web 16 of which has two sealing layers 50, and the other plastic film webs each have only one sealing layer 50. The plastic film webs are again superposed and welded together in such a manner that sealing layer-free surfaces of two plastics film webs are superimposed at two places, without a permanent bond being formed. The film composite is separated without difficulty, so that two individual composites having 2 layers 31, 33 and one individual composite having 3 layers 32' are obtained. Those skilled in the art readily recognize that more than three individual composites may be produced, having not only 2 or 3 layers, but 4 or 5 layers, from film composite 21 having anywhere from about 7 to about 20 plastic film webs.

Figure 6A:
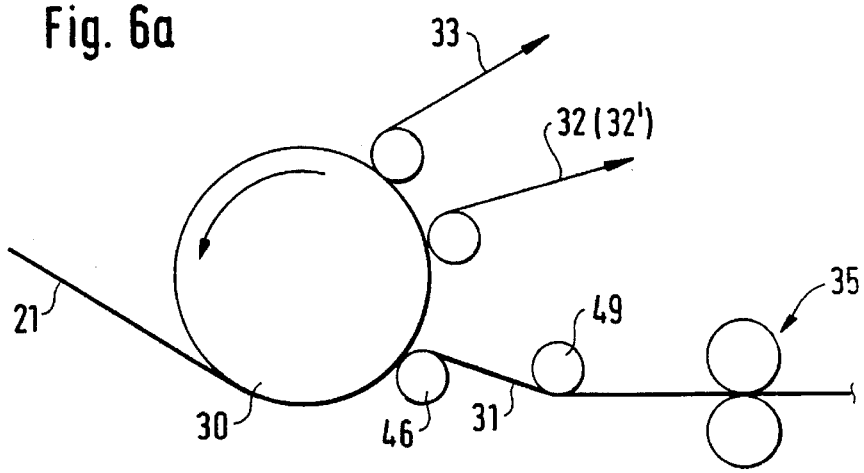
FIG. 6a illustrates an embossing station where an individual composite passes between the rolls and is embossed.

As additional equipment to the device according to the invention illustrated in FIG. 6a, an embossing station 35 which comprises two embossing rollers is provided which is disposed in the direction of travel of individual composite 31 after separating roll 30. Embossing station 35 is provided for embossing individual composite 31 on both sides. Upon release from separating roll 30, individual composite 31 passes through a gap between the two embossing rolls of embossing station 35 so that the top and bottom side of individual composite 31 undergo suitable structuring.

Figure 6B:
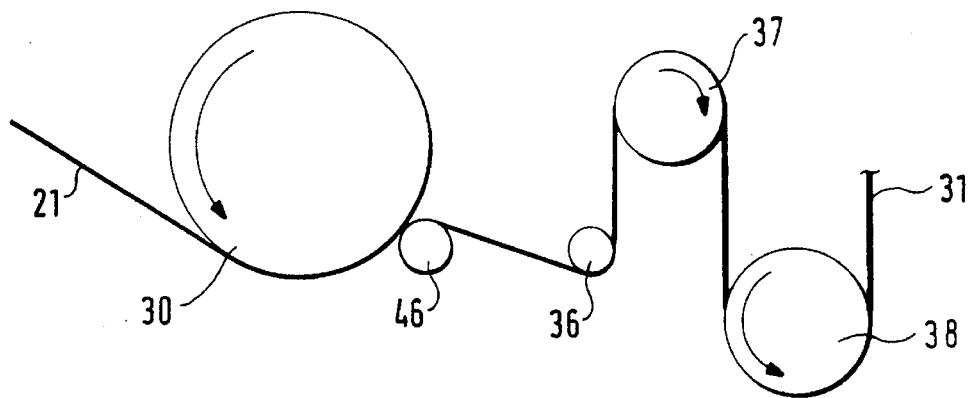
FIG. 6b illustrates a modified embossing station compared with the embodiment according to FIG. 6a, in which the individual composite is guided by means of guide rolls and embossed by the guide rolls.

A method of suitable surface structuring of individual composite 31 is illustrated in FIG. 6b. In this embodiment, individual composite 31, upon release from separating roll 30, is drawn at high tensile stress over a guide roll 36 and in a meandering manner over temperature-controllable rolls 37 and 38, which are offset with respect to each other in a vertical direction. The surfaces of rolls 37 and 38 are either polished to a high gloss or structured. Because of the high tensile stress which is exerted on individual composite 31 by the corresponding drive speed of rolls 37, 38, a corresponding structuring of the two sides of the individual composite 31 takes place. In the exemplary embodiments of FIGS. 3, 6a and 6b, the other parts of the devices in each case corresponding to the embodiments illustrated in FIGS. 1 and 2 are not shown for reasons of space.

Figure 7:
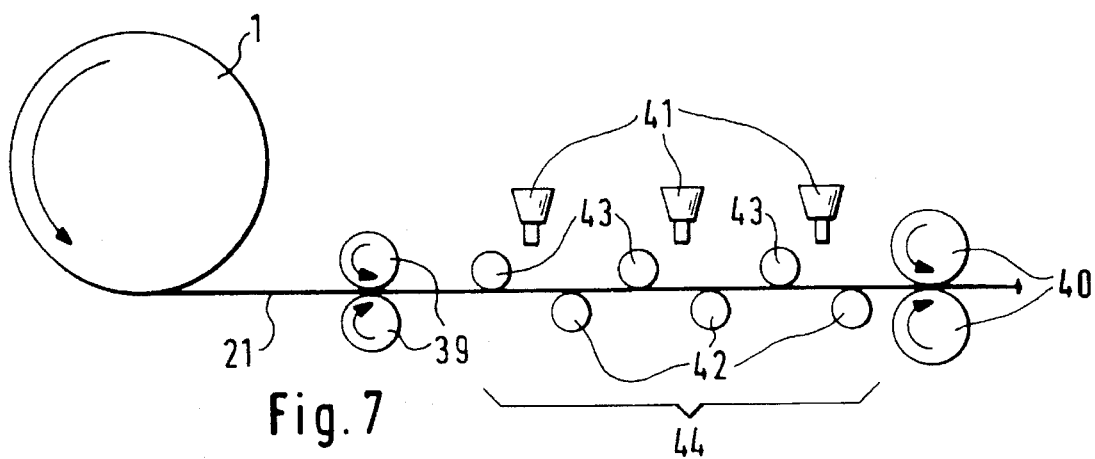
FIG. 7 illustrates a device in which the film composite passes through a cooling arrangement in a flat state before it is separated into individual composites.

FIG. 7 illustrates a cooling arrangement 44, or cooling zone, which is disposed downstream of roll 1. A cooling arrangement 44 of this type can be present with all embodiments as shown in the preceding FIGS. 1 to 3, 6a and 6b. The cooling arrangement 44 consists of a number of fans 41 or air nozzles, through which cooling air passes, and which are disposed above film composite 21, which is transported in a flat position. Cooling arrangement 44 also comprises lower chill rolls 42, over which film composite 21 is transported, and upper chill rolls 43, which are in contact with the top side of the film composite 21. Chill rolls 42 and 43 are offset with respect to each other so that they are in contact alternately with the top and bottom side of film composite 21.

The mode of operation of the individual embodiments of the invention now will be described in greater detail. Individual plastic film webs 14, 15, and 16 are wound on supply rolls 18, 19 and 20, respectively, and are fed via guide rolls 17 to the circumferential surface of roll 1. The biaxially stretched plastic film shown as the lowermost plastic film web 14 on the right hand side of roll 1 in FIG. 1, is guided around a large partial circumference of roll 1 as the lowermost, or base layer. This plastic film web 14 has a sealing layer, for example, only on its side facing away from roll 1, which sealing layer is fused by roll 1 and pressure roll 7, and, if necessary, by heating device 8. The point of contact for monoaxially stretched plastic film web 15, which also may be heated, is located at a certain distance from the point of contact of the plastic film web 14 on roll 1. This plastic film web 15 generally is provided with a sealing layer which faces the sealing layer of plastic film web 14, and is sealed onto plastic film web 14 with the application of pressure by pressure roll 6 or, if necessary, by heating device 9.

The next point of contact for another plastic film web 14 on the circumferential surface of roll 1 is located at the same distance from pressure roll 7, as between the two pressure rolls 7 and 6. This plastic film web 14 has a sealing layer facing away from the two plastic film webs that are laminated together, and can, but need not be, heat-treated by heating device 10. The pressure of pressure roll 5 exerted on the two plastic film webs 14 and 15, which are already sealed together and which form an individual composite 31, applies the plastic film web 14 to individual composite 31, and a sealing bonding does not take place since films without sealing layers are superposed. Another unstretched plastic film web 16, a monoaxially stretched plastic film web 15 and a biaxially stretched plastic film web 14, each provided with a sealing layer, then are applied in sequence in the same manner with the application of pressure and with or without heat onto the three plastic film webs which already are in contact, to form final film composite 21. Here, unstretched plastic film web 16 with its sealing layer, faces the sealing layer of the last-applied plastic film web 14 and is sealed with this to form individual composite 32. The sealing layer of the monoaxially stretched plastic film web 15 faces away from the prior structure, so that the sealing layer-free surfaces of the plastic film webs 16 and 15 are superposed. Finally, the sealing layer of plastic film web 14 is sealed to the sealing layer of plastic film web 15, and the webs 15 and 14 form individual composite 33.

In this manner a film a composite can be built up, for example, from up to about twenty individual polypropylene films. The individual films can be selected from, e.g., films of one or more of biaxially stretched thermoplastic, monoaxially stretched thermoplastic and unstretched thermoplastic, coextruded films, with sealing layers provided on one or both sides. Furthermore, the individual films can optionally be pressure pretreated.

The mechanical characteristics of the starting films, and thus also the characteristics of the film composite, can be influenced as desired by the use of the heating devices in the form of infrared heaters 8 through 13. In the case of oriented plastic films such heating may affect the mechanical characteristics of the film by shrinking. In accordance with the present invention, plastic film webs of the same or different kinds can be sealed together. This applies both to treated and to non-treated starting films. Metal films, alone or as a composite with plastic films, paper sheets or other materials that do not consist of plastics also may be used as starting films. With the application of heat, those skilled in the art recognize that the sealing temperature must be kept below the melting temperature of the individual plastic film webs, and that unstretched film webs have, in general, a lower melting temperature than stretched film webs.

The sealing layers of the plastic film webs typically are fused by heating each plastic film web before contact with the circumferential surface of heated roll 1. Skilled practitioners in the art recognize that the temperature required to effect fusion of the adjacent plastic film webs depends, in part, upon the chemical constituency of the plastic film web and the chemical constituency of the sealing layer. The required sealing temperature, depending on the sealing raw material, is ordinarily between about 90° and about 140° C. Since the sealing temperature is always kept below the melting temperature of the individual plastic film web, the orientations produced by stretching the individual plastic film webs are maintained even after sealing.

Upon release from roll 1, film composite 21 is guided via separating roll 30 and separated into the individual composites 31, 32 and 32' and 33, which then are provided for further processing. In accordance with the device illustrated in FIGS. 1 to 3, 6a, 6b and 7, film composite 21 is subject to additional treatment stages after release from the circumferential surface of roll 1, such as blowing with cooling air by fan 22 in FIG. 2, and cooling by contact with temperature-controllable chill roll 23. The individual composite or composites are cooled even further after separating, for example by a cooled double belt press 25. Instead of fan 22, an air nozzle also can be used, through which the cooling air is blown onto the top side of film composite 21. As a result of the present invention, the flatness of film composite 21 is improved by the cooling.

Through use of the additional equipment illustrated in FIG. 3 with the device according to the invention, individual composite 31 can be stretched by temperature-controllable roll 28 and driven temperature-controllable roll 29 in order to counteract any curling tendency of the individual composite which may occur. Further process measures for treating individual composites include an embossing of the film composites on both sides, in which case different embossing measures may be used. These embossing process stages are carried out using the additional equipment illustrated in FIGS. 6a and 6b. Embossing of an individual composite 31 on both sides is carried out in embossing station 35, where individual composite 31 passes through the roll gap of the two embossing rolls, as shown in FIG. 6a.

An additional process measure for structuring individual composite 31 with the device according to FIG. 6b consists of guiding the individual composite in a meandering manner over driveable and temperature-controllable rolls 37, 38 and exerting a variable tensile stress on individual composite 31 by the adjustable rotational speed of these rolls. The exertion of this variable tensile stress produces a structuring of the surfaces of the film composite. One method of embossing the individual composite on one or both sides consists of forming rolls 37 and/or 38 as embossing rolls. If a high degree of flatness of film composite 21 is desired, it is preferable that the film composite travel horizontally with intensive cooling taking place using the device illustrated in FIG. 7. In accordance with this embodiment, temperature-controllable chill rolls and fans or air nozzles, through which cooling air is blown onto the surface of film composite 21, act together in combination to provide a flat composite.

The film composites typically are divided into individual composites which are used for producing multi-layer thick films or sheets with tailored properties. Therefore, instead of the individual plastic film webs, individual composites of this type, as produced according to the above described process, are sealed together in the same manner as the film webs.

The present invention has been described in detail with reference to preferred embodiments as a manner of exemplification only, and not of limitation. Those skilled in the art readily recognize that various modifications may be made to the present invention without departing from the spirit and scope thereof.

What is claimed is:

1. A device for producing a plurality of individual composites having at least two layers of film web sealed together comprising:
 (a) a plurality of means for mounting a plurality of film webs, at least one of said plurality of film webs having at least one sealing layer disposed thereon;
 (b) a heatable roll which has a circumferential surface where at least two superposed film webs are sealed together and subsequently released;
 (c) a plurality of heatable pressure rolls capable of exerting pressure, heat or both pressure and heat which contact said heatable roll along its circumferential surface and form a gap therebetween, wherein:
   (i) each of said plurality of film webs is guided through said gap between each of said plurality of heatable pressure rolls and the heatable roll to seal said film webs together along the sealing layer by application of pressure to form a film composite; and
   (ii) said plurality of film webs are arranged so that no sealing layer is present between at least two adjacent film webs of said composite;
 (d) a displaceable heating device selected from an infrared heater or an air nozzle through which hot air passes to effect fusion of sealing layers of the film webs or altering the mechanical characteristics of said film webs by shrinking said film webs before the film webs are brought together in said gap, said heating device being disposed near said gap between each of said plurality of heatable pressure rolls and the circumferential surface of said heatable roll to apply heat without contacting said film webs;
 (e) a cooling means for cooling said composite upon release from said heatable roll; and
 (f) a separating roll for separating said composite into a plurality of individual composites upon release from said heatable roll and cooling from said cooling means, said separating taking place along a partial circumference of said separating roll where no sealing layer is present between at least two adjacent film webs.

2. The device as claimed in claim 1, wherein said plurality of heatable pressure rolls are disposed at equal distances along the circumferential surface of said heatable roll.

3. The device as claimed in claim 1, wherein said plurality of heatable pressure rolls are disposed at varying distances along the circumferential surface of said heatable roll.

4. The device as claimed in claim 1, wherein said plurality of heatable pressure rolls exert only heat so that said film webs are sealed together along the sealing layer by application of heat.

5. The device as claimed in claim 1, wherein said plurality of heatable pressure rolls exert both heat and pressure so that said film webs are sealed together along the sealing layer by application of pressure and heat.

6. The device as claimed in claim 1, wherein each of said displaceable heating devices is an air nozzle which can be displaced along the film web at an adjustable distance from said heatable roll.

7. The device as claimed in claim 1, wherein said plurality of said film webs is less than or equal to said plurality of heated pressure rolls.

8. The device as claimed in claim 7, wherein said plurality of said film webs is less than about 20.

9. The device as claimed in claim 1, wherein the heatable pressure rolls exert pressure by pressure means selected from the group consisting of hydraulic, pneumatic and mechanic means, with varying intensity against said heatable roll in order to exert a variable line pressure on said film webs.

10. The device as claimed in claim 1, wherein each of said plurality of heatable pressure rolls comprises a heated backing roll having a metal body and a rubber coating.

11. The device as claimed in claim 1, wherein each of said plurality of heatable pressure rolls is a metal roll polished to a high gloss without rubber coating.

12. The device as claimed in claim 1, wherein each of said displaceable heating devices is an infrared heater which can be displaced along the film web at an adjustable distance from said heatable roll.

13. The device as claimed in claim 1, wherein said film composite, upon release from said heatable roll, passes a cooling means which is selected from one or more of the group consisting of a fan, a temperature-controllable chill roll and a cooling bath.

14. The device as claimed in claim 1, said device further comprising a roll arrangement disposed after said separating roll having driven, temperature-controllable rolls with different diameters for subsequent stretching and eliminating the curling tendency of at least one of said plurality of said individual composites.

15. The device as claimed in claim 1, wherein, after release from said separating roll, at least one of said plurality of individual composites passes through a gap between two embossing rolls of an embossing station.

16. The device as claimed in claim 1, wherein at least one of said plurality of individual composites is guided, after release from said separating roll, with high tensile stress in a meandering form over temperature-controllable rolls, which are offset with respect to each other in a vertical direction, and the surfaces of which are polished to a high gloss or are structured.

17. The device as claimed in claim 1, wherein after release from said heatable roll, the film composite passes in a flat state through a cooling arrangement which comprises a plurality of one or more of fans and chill rolls, which are offset with respect to each other and alternately contact the top and bottom side of the film composite.

18. The device as claimed in claim 1, wherein said plurality of film webs are comprised of films selected from one or more of the group consisting of biaxially stretched thermoplastic, monoaxially stretched thermoplastic, and unstretched thermoplastic, coextruded films.

* * * * *